US012705763B2

(12) United States Patent
Jang et al.

(10) Patent No.: US 12,705,763 B2
(45) Date of Patent: Aug. 11, 2026

(54) DEVICE AND METHOD WITH CAMERA POSE ESTIMATION

(71) Applicant: Samsung Electronics Co., Ltd., Suwon-si (KR)

(72) Inventors: Cheolhun Jang, Suwon-si (KR); Jahoo Koo, Suwon-si (KR); Dae Hyun Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 375 days.

(21) Appl. No.: 18/464,654

(22) Filed: Sep. 11, 2023

(65) Prior Publication Data

US 2024/0169562 A1 May 23, 2024

(30) Foreign Application Priority Data

Nov. 18, 2022 (KR) ........................ 10-2022-0155458

(51) Int. Cl.
*G06T 7/246* (2017.01)
*G06T 7/73* (2017.01)

(52) U.S. Cl.
CPC ................ *G06T 7/248* (2017.01); *G06T 7/74* (2017.01); *G06T 2207/20084* (2013.01)

(58) Field of Classification Search
CPC ................. G06V 10/945; G06V 20/70; G06V 30/19147; G06V 10/774; G06V 10/764
See application file for complete search history.

(56) References Cited

U.S. PATENT DOCUMENTS 8,965,057 B2 * 2/2015 Arth .......................... G06T 7/74 382/107
9,674,507 B2 6/2017 Pirchheim et al.
2021/0012520 A1 * 1/2021 Zhou .................... G05D 1/0038
2021/0354302 A1 * 11/2021 Bathala .................. G06T 7/248
2021/0406618 A1 12/2021 Park et al.

FOREIGN PATENT DOCUMENTS

CN 110070615 B * 4/2021 ............. G06V 20/10
JP 2022-107234 A 7/2022
KR 10-2022-0074782 A 6/2022
WO WO 2021/018690 A1 2/2021

OTHER PUBLICATIONS

Costante, Gabriele, et al. “Exploring Representation Learning With CNNs for Frame-to-Frame Ego-Motion Estimation.” IEEE robotics and automation letters 1.1 (2015): 18-25.

(Continued)

*Primary Examiner* — Pinalben Patel
(74) *Attorney, Agent, or Firm* — NSIP Law

(57) ABSTRACT

Disclosed are a device and method with pose estimation. A method of operating an electronic device includes: obtaining monocular images captured at different respective points in time by a same camera; estimating, based on a neural network, a position change of the camera corresponding to the time between the points in time at which the images were captured; and estimating a position and/or orientation of the camera based on the estimated position change of the camera and based on the images.

20 Claims, 9 Drawing Sheets

(56) References Cited

OTHER PUBLICATIONS

Kreuzig, Robin, et al, "DistanceNet: Estimating Traveled Distance from Monocular Images Using a Recurrent Convolutional Neural Network." Proceedings of the IEEE/CVF Conference on Computer Vision and Pattern Recognition Workshops. 2019., (9 pages).
Zhai, Guangyao, et al. "PoseConvGRU: A Monocular Approach for Visual Ego-Motion Estimation by Learning." Pattern Recognition 102 (2020): 107187., (13 pages).
Anonymous "Monocular Visual Simultaneous Localization and Mapping" MATLAB & Simulink, Retrieved from the Internet: URL:https://web.archive.org/web/20201201143636/https://www.mathworks.com/help/vision/ug/monocular-visual-simultaneous-localization-and-mapping.html, Dec. 1, 2020, (2 pages).
Extended European search report issued on May 15, 2024, in counterpart European Patent Application No. 23183096.9 (12 pages).
Yang et al. "D3VO: Deep Depth, Deep Pose and Deep Uncertainty for Monocular Visual Odometry" *Proceedings of the IEEE/CVF conference on computer vision and pattern recognition*, Mar. 28, 2020 (pp. 1-15).

* cited by examiner

DEVICE AND METHOD WITH CAMERA POSE ESTIMATION

CROSS-REFERENCE TO RELATED APPLICATIONS

This application claims the benefit under 35 USC § 119(a) of Korean Patent Application No. 10-2022-0155458, filed on Nov. 18, 2022, in the Korean Intellectual Property Office, the entire disclosure of which is incorporated herein by reference for all purposes.

BACKGROUND

1. Field

The following description relates to a device and method with camera pose estimation.

2. Description of Related Art

Simultaneous localization and mapping (SLAM) algorithms estimate position and orientation while performing localization and mapping at the same time. Visual inertial odometry (VIO), which is an elemental technique related to localization in SLAM, may estimate position, velocity, and orientation using a camera and an inertial sensor (e.g., an inertial measurement unit (IMU)).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electronic device includes: one or more processors; and a memory storing instructions configured to, when executed by the one or more processors, cause the one or more processors to: obtain two single images captured at two respective points in time by a same camera, estimate a position change of the camera that occurred during the time interval between the two points based on a neural network, and estimate a position and/or orientation of the camera, based on the estimated position change of the camera and based on the two images.

The instructions may be further configured to cause the one or more processors to estimate the position and/or orientation of the camera by performing a simultaneous localization and mapping (SLAM) operation based on an initial estimation result, wherein the initial estimation result is a result of initially estimating a pose variation of the camera based on feature point matching between feature points of the two images and the estimated position change of the camera.

The instructions may be further configured to cause the one or more processors to estimate the position and/or orientation of the camera by adjusting a scale of the initial estimation result according to the estimated position change of the camera.

The initial estimation result for the pose variation may include pose variations of the camera for time intervals between a current image and respective previous images, wherein the current image is one of the two images and the other of the two images is one of the previous images, and the estimated position change of the camera may include estimated position changes of the camera between the current image and the respective previous images, wherein the instructions may be further configured to cause the one or more processors to estimate the position and/or orientation of the camera by adjusting the scale of the initial estimation result so that an error between the pose variations and the estimated position changes of the camera is minimized.

Estimating the position and/or orientation of the camera based on the position change of the camera may reduce scale ambiguity in the SLAM operation.

The SLAM operation may be performed based on a monocular visual SLAM algorithm configured for processing monocular images.

The neural network may be trained based on reference images collected by a reference device and based on reference position changes of a reference camera for respective time intervals between times at which the reference images were captured, the reference device may include the reference camera and a reference position sensor and/or a reference inertial sensor that may sense positions upon which the reference position changes are based.

The reference images may be captured at different respective reference points in time by the reference camera, and the reference position changes are determined by values sensed by the reference position sensor and/or the reference inertial sensor at the respective reference points in time.

The electronic device may be, or may be included in: an autonomous vehicle, a vehicle equipped with a driving assistance system, a vehicle supporting advanced driver-assistance systems (ADAS), a smartphone equipped with a camera, a wearable device, or a robot.

In one general aspect, a method of operating an electronic device includes: obtaining monocular images captured at different respective points in time by a same camera; estimating, based on a neural network, a position change of the camera corresponding to the time between the points in time at which the images were captured; and estimating a position and/or orientation of the camera based on the estimated position change of the camera and based on the images.

The estimating of the position and/or orientation of the camera may include performing a simultaneous localization and mapping (SLAM) operation based on an initial estimated pose variation of the camera based on feature point matching between the images and based on the estimated position change of the camera.

The initial estimation result for the pose variation may include pose variations of the camera for time intervals between a current image and respective previous images, wherein the current image is one of the images and another of the images is one of the previous images, and the estimated position change of the camera may include estimated position changes of the camera between the current image and the respective previous images, and the estimating the position and/or orientation of the camera may be performed by adjusting the scale of the initial estimation result so that an error between the pose variations and the estimated position changes of the camera is minimized.

The estimating of the position and/or orientation of the camera may be performed by adjusting a scale of the initial estimation result for a pose variation of the camera according to the position change of the camera.

The estimating of the position and/or orientation of the camera may reduce scale ambiguity in the SLAM operation based on feature point matching between the images.

The SLAM operation may be performed based on monocular visual SLAM based on a single camera corresponding to the camera.

The neural network may be trained based on reference images collected by a reference device and based on reference position changes of a reference camera for respective time intervals between times at which the reference images are captured, and the reference device may include the reference camera and a reference position sensor and/or a reference inertial sensor that senses the positions upon which the reference position changes are based.

The reference images may be captured at different respective reference points in time by the reference camera, and the reference position changes may be determined by values sensed by the reference position sensor and/or the reference inertial sensor at the respective reference points in time.

The position change may be a distance.

A non-transitory computer-readable storage medium may store instructions that, when executed by a processor, cause the processor to perform any of the methods.

Other features and aspects will be apparent from the following detailed description, the drawings, and the claims.

Figure 1:
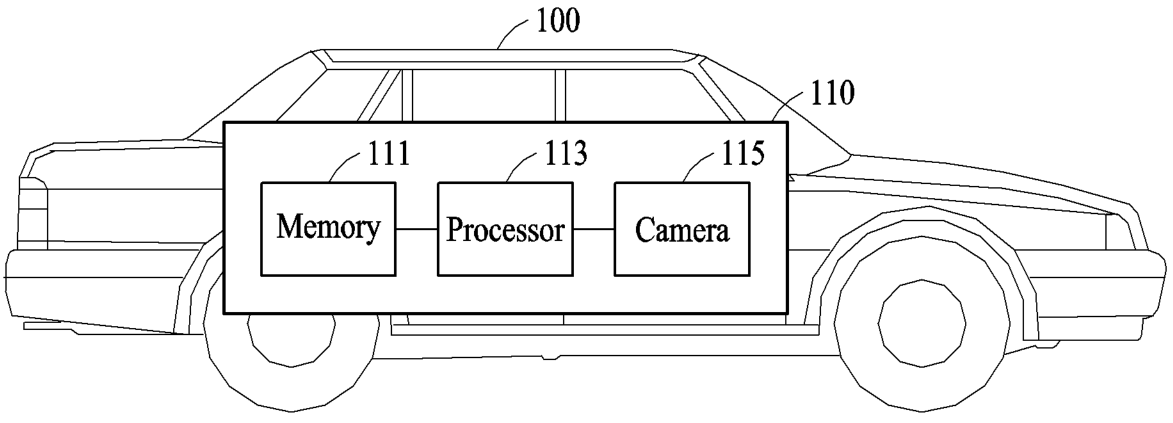
FIG. 1 illustrates an example of an electronic device, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example electronic device, according to one or more embodiments.

Referring to FIG. 1, a vehicle 100 may be any means of transportation traveling on a road or track. The vehicle 100 may, for example, an automobile, a motorcycle, or the like, and, in the case of being an automobile, the automobile may be various types such as a passenger car, a freight vehicle, a two-wheeled vehicle, etc. The vehicle 100 may be an autonomous vehicle, an intelligent vehicle, a vehicle equipped with a driving assistance system, and a vehicle supporting advanced driver-assistance systems (ADAS). Herein, the vehicle 100 may be a vehicle equipped with an electronic device 110. The electronic device 110 may include a memory 111, a processor 113, and a camera 115.

The electronic device 110 may estimate a pose, that is, a position and/or orientation (in any frame of reference, e.g., with respect to the vehicle 100), of the camera 115 based on images acquired by the camera 115 at different points in time. The electronic device 110 may estimate a position change of the camera 115 based on the images, and estimate the position and/or orientation of the camera 115 by performing a simultaneous localization and mapping (SLAM) operation based on the estimated position change of the camera 115 and based on feature point matching between the images. Estimating the position and/or orientation of the camera 115 is described with reference to FIGS. 3 and 4.

In implementations where the camera 115 is disposed in a vehicle such as the vehicle 100, when the pose of the camera 115 is estimated, the pose of the vehicle 100 may be trivially determined. The estimated pose of the vehicle 100 may be used to control the vehicle 100 or provide various services to a user who is in the vehicle 100. However, examples are not limited thereto.

The memory 111 may store computer-readable instructions. The processor 113 may perform operations to be described hereinafter as the instructions stored in the memory 111 are executed by the processor 113. The memory 111 may be a volatile memory and/or a non-volatile memory.

The processor 113 may be a device that executes instructions (or programs) or controls the electronic device 110 and may include, for example, a central processing unit (CPU) and/or a graphics processing unit (GPU). The processor 113 may obtain images captured at different points in time by the same camera, estimate a position change of the camera between the two points in time at which the images are captured based on a neural network, and estimate a position and/or orientation of the camera based on the position change of the camera and the images. Although for convenience descriptions herein refer to "the processor" in the singular, "the processor" as used herein refers to one or more processors of possibly varying types and does not imply the same processor throughout. Moreover, the use of "the processor" does not mean that there is only one device disclosed herein; the descriptions herein describe various examples and embodiments, each having one or more processors.

The camera 115 may output the images by capturing a scene in front of, or in a traveling direction of, the vehicle 100. The images captured by the camera 115 may be transmitted to the processor 113.

Although the camera 115 is illustrated as being included in the electronic device 110 in the example of FIG. 1, examples are not limited thereto. The description in the present disclosure may also apply to a case where the electronic device 110 receives images from an external camera and performs calibration. In addition, although the electronic device 110 is illustrated as being provided in the vehicle 100 in the example of FIG. 1, examples are not limited thereto. The images captured by the camera 115 provided in the vehicle 100 may be transmitted to the vehicle 100 or an external electronic device 110 to estimate the pose of the camera 115 or the vehicle 100. In this example, the electronic device 110 may be, or may be implemented in, any of various computing devices, such as a mobile phone, a smart phone, a tablet, a laptop, a personal computer (PC), a remote server, and the like.

Figure 2:
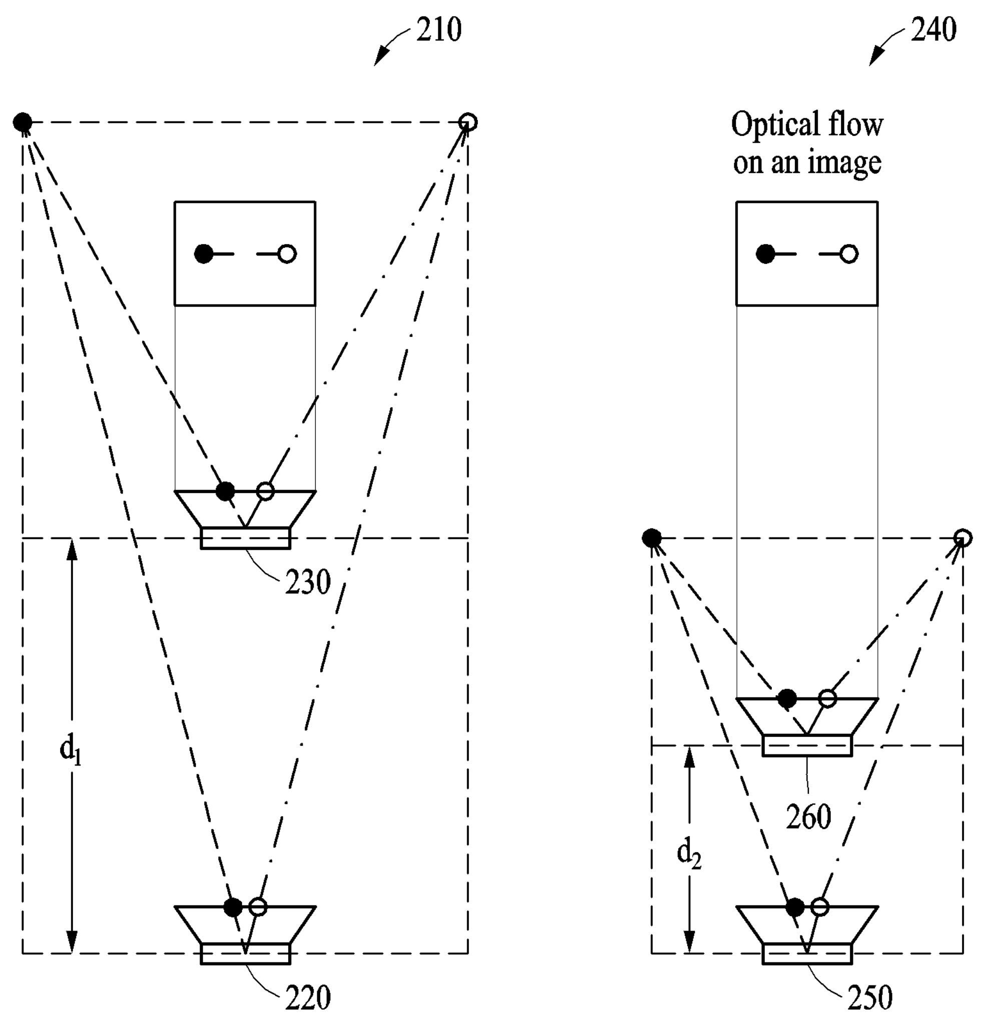
FIG. 2 illustrates an example of scale ambiguity using monocular visual simultaneous localization and mapping (SLAM), according to one or more embodiments.

FIG. 2 illustrates an example of scale ambiguity using monocular visual SLAM, according to one or more embodiments.

Referring to FIG. 2, an electronic device may be configured to perform feature point matching between images captured at different points in time by a single camera based on monocular visual SLAM, and estimate a position and/or orientation of the camera based on a result thereof.

Visual SLAM is a technique for performing localization and mapping to estimate, in 3D, a change in pose compared to an image previously acquired by a camera based on another image acquired through the camera. Monocular visual SLAM is a type of visual SLAM that uses a single camera without using other sensors. The phrase "single camera" refers to a single sensor capturing a single image at a time for use with SLAM; a binocular camera, multi-sensor cameras, etc. may be used but only one sensor or image at a time may be used. A monocular visual SLAM model may extract feature points respectively from images captured by a single camera. The feature points may be extracted from image points having distinct changes in color or brightness, for example, a corner or an endpoint of a line segment in the images, etc. However, examples are not limited thereto. Corresponding feature points may be found through feature point matching of images captured at two or more points in time, and the pose of the camera may be estimated using this information.

However, even when feature points of the images are accurately matched, monocular visual SLAM may estimate the pose of the camera differently according to a scale factor. Referring to a first hypothetical case 210 and a second hypothetical case 240 shown in FIG. 2, even with a completely identical feature point matching result between two images, a distance moved by the camera between the time of taking the two images may be calculated differently, for example, as $d_1$ and $d_2$, with respect to an actual distance (e.g., depth) to a feature point. In the first hypothetical case 210, the first camera position 220 indicates a hypothetical position of the camera at a first point in time, and the second camera position 230 indicates a hypothetical second position of the camera at a second point in time. Similarly, in the second hypothetical case 240, a third camera position 250 indicates a hypothetical position of the camera at the first point in time, and a fourth camera position 260 indicates a hypothetical position of the camera at the second point in time. In both cases, although the features may match between the two images, different camera positions may both potentially be predicted by a monocular SLAM model. To summarize, monocular visual SLAM can fail to accurately predict the movement of the single camera between the capturing of two feature-matched images.

Such scale ambiguity, which can cause inaccurate estimation of the moving distance of the camera, may be solved by estimating, through a neural network, a position change of a camera between two points in time at which images are captured based on those images, as described with reference to FIGS. 3 and 4A.

FIG. 3 and FIGS. 4A to 4C illustrate examples of estimating a pose of a camera, according to one or more embodiments.

Figure 3:
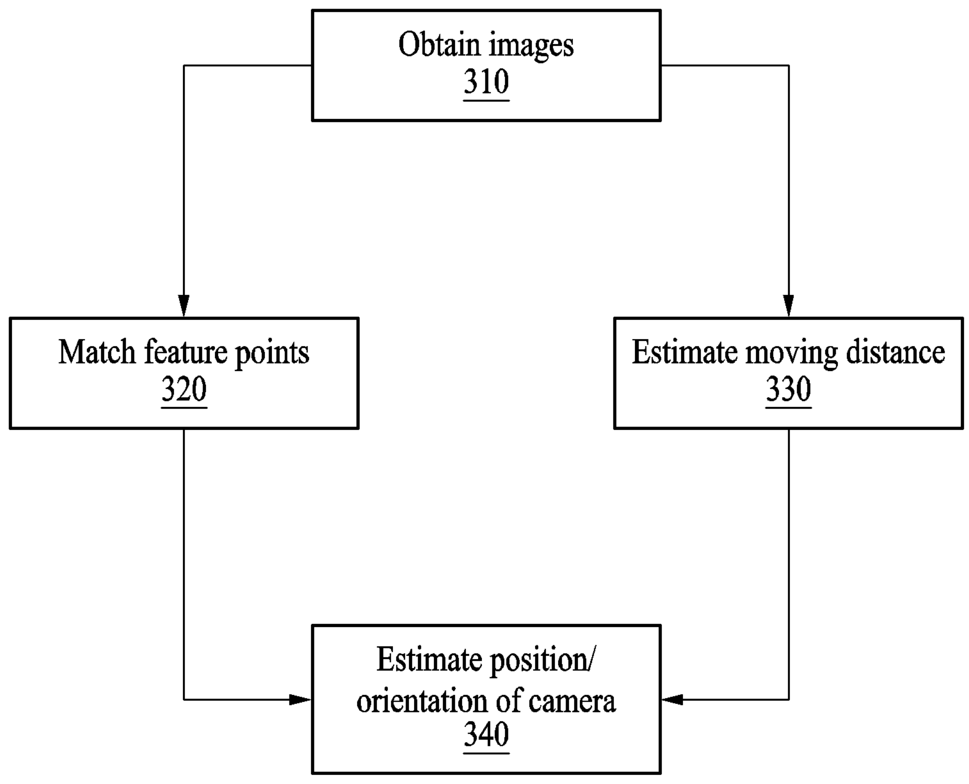
FIG. 3 illustrates a general data flow for camera pose estimation, according to one or more embodiments.

Referring to FIG. 3, operations for estimating a pose of a camera are shown.

In operation 310, an electronic device may obtain images captured at different respective points in time by the same camera. The electronic device may obtain, from a single camera, two or more images captured at different respective times. For example, the images may be a previous frame image and a current frame image, or a previous key frame image and a current key frame image, but any images captured at different points in time may be applied without limitation.

In operation 320, the electronic device may extract feature points respectively obtained from the images and match the feature a point in in one image with a feature point in the other image.

In operation 330, the electronic device may estimate a position change of the camera between the two points in time at which the images were captured (e.g., a moving distance of the camera for the two points in time), through a neural network into which the obtained images are input. The neural network that estimates the position change of the camera may be a relatively lightweight model (compared to a monocular visual SLAM model that solves scale ambiguity through deep learning), therefore the neural network may operate online in real time, moreover it may be relatively easy to obtain training data for the neural network.

Reference images generated by a reference device including a reference camera and a reference position sensor and/or a reference inertial sensor and a reference position change of the reference camera between two reference points in time at which the reference images are captured may be easily collected as the training data. Here, the reference camera, the reference position sensor, the reference inertial sensor, the reference device, the reference images, and the reference position change may be intended for generating the training data for the neural network, and may be distinguished from the camera, the position sensor, the inertial sensor, the electronic device, the images, and the position change that are utilized during runtime of the electronic device using a neural network trained with the training data generated by the reference device. For example, the reference position sensor may include a global positioning system (GPS) sensor, and the reference inertial sensor may include an inertial measurement unit (IMU) sensor. However, examples are not limited thereto. The reference images may be captured at different points in time by the reference camera, and the reference position change may be determined by values sensed by the reference position sensor and/or the reference inertial sensor at the two reference points in time. Since the reference position change matched to the reference image may be obtained relatively easily at a low cost through the reference position sensor and/or the reference inertial sensor, the cost of implementing the neural network may be low.

In operation 340, the electronic device may estimate a pose of the camera based on a result of matching the feature points and based on the position change of the camera. The electronic device may perform a SLAM operation based on the result of matching the feature points and the position change of the camera. The electronic device may estimate the pose of the camera by adjusting a scale of the result of matching the feature points according to the position change of the camera. The electronic device may estimate the pose of the camera with high accuracy, by eliminating, based on the position change of the camera, scale ambiguity occurring in the SLAM operation based on feature point matching between the images.

Figure 4A:
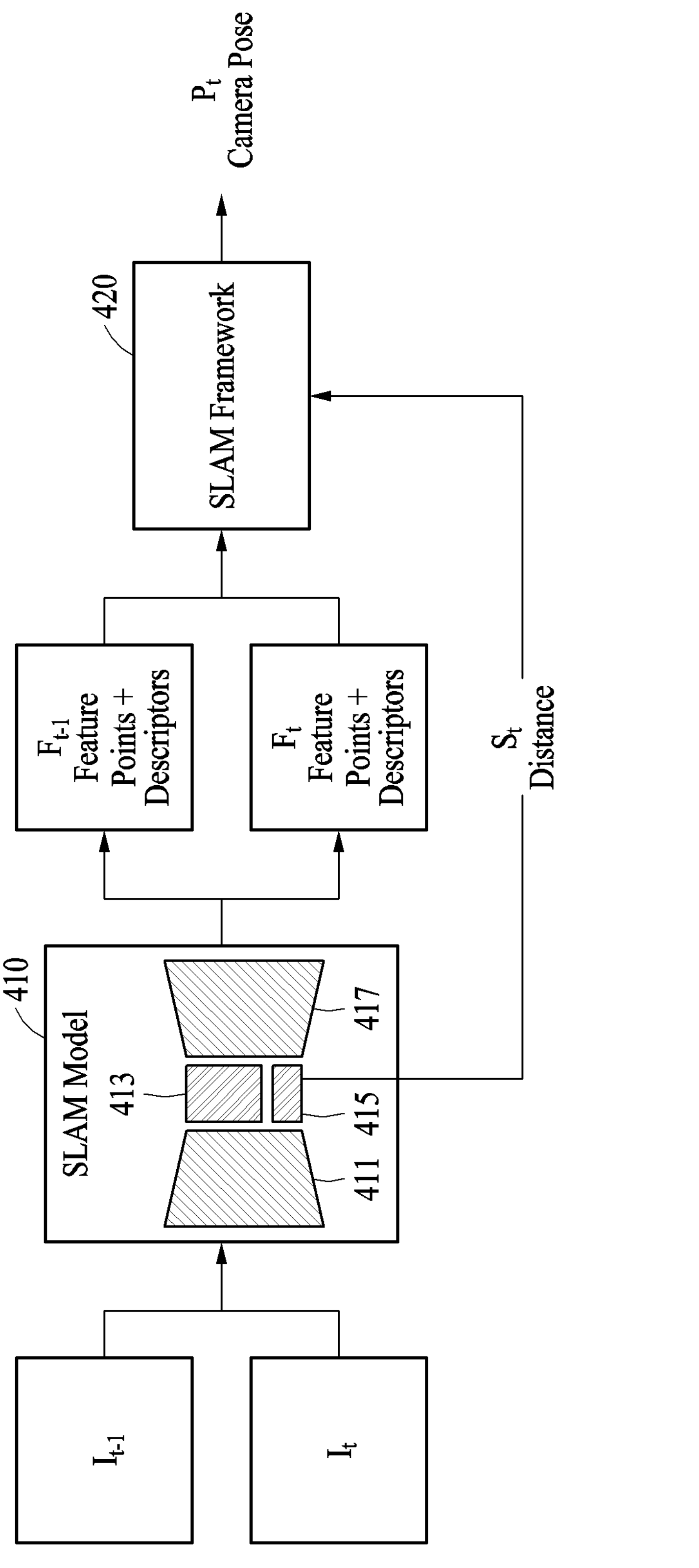
FIG. 4A illustrates a system for camera pose estimation, according to one or more embodiments.

Referring to FIG. 4A, a SLAM model 410 for estimating a pose of a camera and a SLAM framework 420 are shown.

Images (e.g., a previous frame image $I_{t-1}$ and a current frame image $I_t$) captured at different points in time may be input into the SLAM model 410. The SLAM model 410 may be a neural network model, and may include, for example, an encoder 411, a position change estimation model 415, and a decoder 417. The encoder 411 may be a model that extracts a feature 413 that increases with the number of channels while reducing the size of the images by performing a convolution operation on the input images, and may be, for example, a convolutional neural network (CNN), ResNet, PoseNet, EfficientNet, or the like. The feature 413 (or feature map) extracted by the encoder 411 may have a resolution lower than that of the input resolution of the encoder 411. The position change estimation model 415 may be a deep learning model, and may estimate a position change $S_t$ of the camera corresponding to the time interval between the two points in time at which the images are captured based on the feature 413 extracted by the encoder 411. As described above, the position change estimation model 415 may be trained based on reference images collected together by a reference device and a reference position change of a reference camera between two reference points in time at which the reference images were captured. Since the reference device may simultaneously collect the reference images and the reference position change, it may be relatively easy to collect training data for the position change estimation model 415. The decoder 417 may output feature maps (e.g., a previous feature map $F_{t-1}$ and a current feature map $F_t$) with a resolution similar to or the same as the resolution of the images through up-sampling of increasing the size of the feature 413 extracted by the encoder 411. Each of the feature maps may be an N-channel feature map with the resolution of the input resolution of the encoder 411, and may include feature points and descriptors. The descriptors may include information about the feature points (e.g., colors, shapes, sharpness, and the like).

The SLAM framework 420 may match the feature maps output from the decoder 417 with each other, initially estimate a pose variation of the camera based on a matching result, adjust a scale of an initial estimation result based on the position change $S_t$ of the camera, and perform mapping based on a result of the adjusting, and may repeat the foregoing operations. Through these operations, the pose $P_t$ of the camera may be finally determined. For example, the pose variation may be a variation of the position and/or orientation, and may be expressed as a vector. $P_t$ may include the position (e.g., x, y, z) and/or orientation (e.g., roll, pitch, yaw) of the camera.

The operation of the SLAM framework 420 adjusting the scale of the initial estimation result based on the position change $S_t$ of the camera is described in detail with reference to FIGS. 4B and 4C.

Figure 4B:
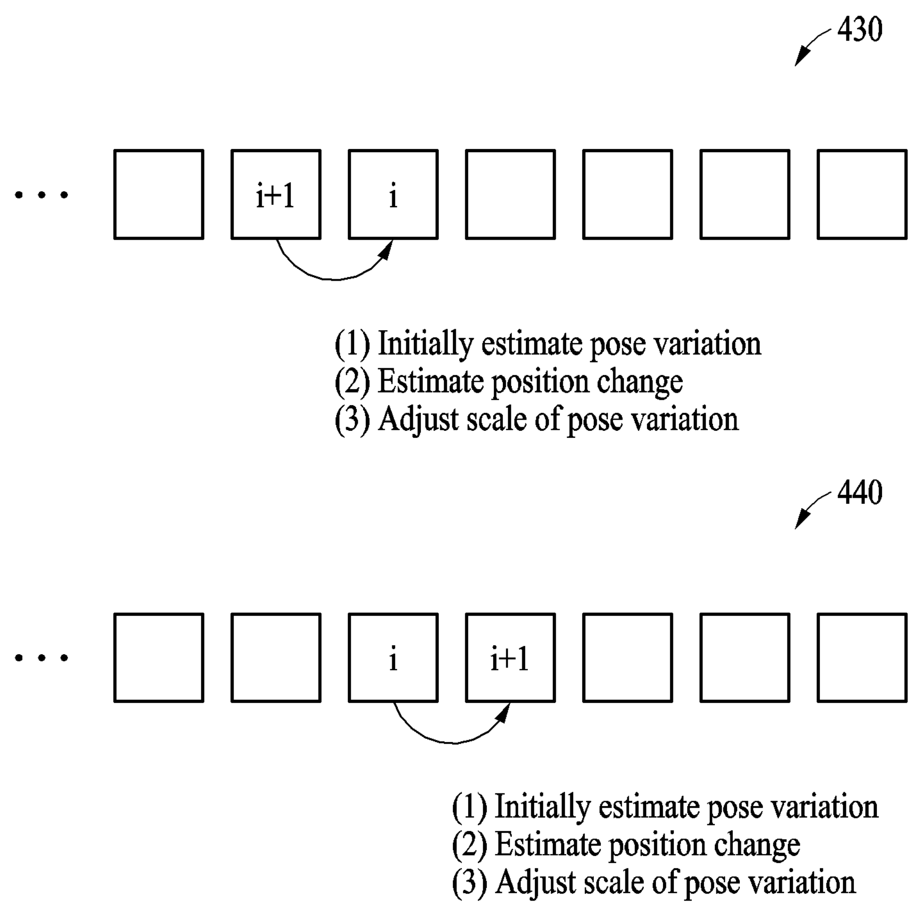
FIG. 4B illustrates camera pose estimation over a sequence of images, according to one or more embodiments.

FIG. 4B shows an example of adjusting a scale of an initial estimation result with respect to a pose variation of a camera according to a position change of the camera. Here, the pose variation of the camera may be initially estimated by the SLAM framework 420, and the position change of the camera may be estimated by the position change estimation model 415.

For a first point in time 430, a current frame may be an i-th frame, and for a previous point in time a previous frame may be an (i−1)-th frame.

An electronic device may estimate a pose variation of the camera between two points in time based on the current frame and the previous frame. The pose variation of the camera between the two points in time may be estimated based on a result of matching feature points corresponding to the respective frames. The pose variation of the camera may indicate how much the position or orientation of the camera has changed at a current point in time compared to the previous point in time. In the initial estimation result with respect to the pose variation of the camera, a position variation of the camera may be inaccurate due to the scale ambiguity described above.

The electronic device may estimate a position change of the camera from the current frame and the previous frame based on a position change estimation model.

The electronic device may adjust a scale of the initial estimation result of the pose variation of the camera according to the position change of the camera. For example, the electronic device may adjust the scale of the initial estimation result so that the position variation of the camera in the initial estimation result with respect to the pose variation of the camera is the same as the position change of the camera estimated by the position change estimation model.

At a second point in time 440, which follows the first point in time 430, the current frame may be an (i+1)-th frame, and the previous frame may be the i-th frame. The operations described above may also be performed at the second point in time 440.

Figure 4C:
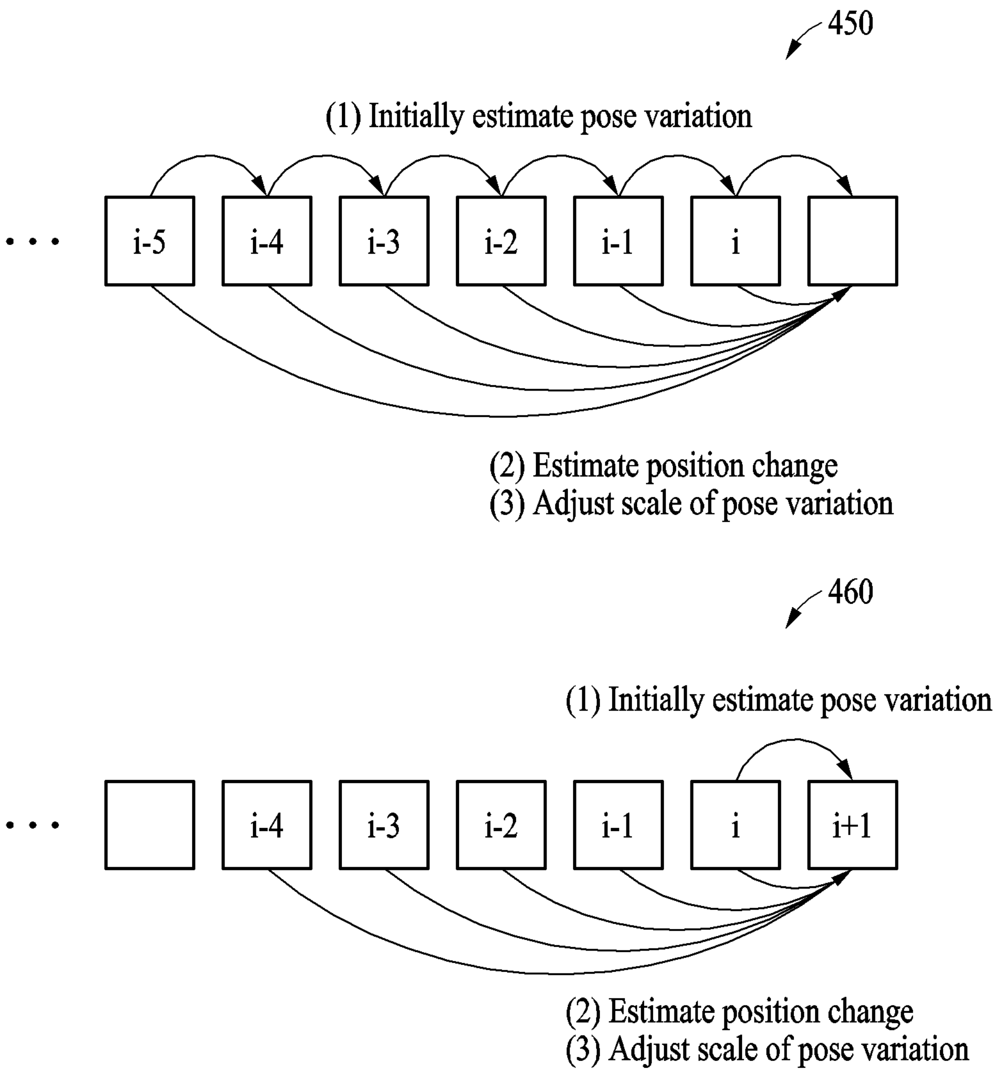
FIG. 4C illustrates another example of estimating a camera pose, according to one or more embodiments.

FIG. 4C shows another example of adjusting a scale of an initial estimation result with respect to a pose variation of a camera according to a position change of the camera. FIG. 4B shows an example of estimating the position change of the camera for a single previous frame and adjusting the scale of the pose variation, whereas FIG. 4C shows an example of estimating the position change of the camera for a plurality of previous frames and adjusting the scale of the pose variation based thereon. Taking into account more movements of the camera through the plurality of previous frames may improve the accuracy of adjusting the scale of the pose variation. Even when an error occurs in estimating the position change of the camera with respect to a predetermined frame, the effect of the error on the accuracy of adjusting the scale of the pose variation may be effectively reduced.

Here, the pose variation of the camera may be initially estimated by the SLAM framework 420 of FIG. 4A, and the position change of the camera may be estimated by the position change estimation model 415 of FIG. 4A.

At a first point in time 450, a current frame may be an i-th frame, and a plurality of previous frames may be (i−5)-th, (i−4)-th, (i−3)-th, (i−2)-th, and (i−1)-th frames.

The electronic device may estimate a pose variation of the camera between two points in time based on two adjacent frames. For example, the electronic device may estimate a pose variation of the camera between two points in time based on the (i−5)-th frame and the (i−4)-th frame, and estimate a pose variation of the camera between two points in time based on the (i−4)-th frame and the (i−3)-th frame. Pose variations of the camera with respect to the other adjacent frames may be estimated in the same manner.

The electronic device may determine a pose variation of the camera between each of the plurality of previous frames and the current frame, using pose variations of the camera based on two adjacent frames. For example, a pose variation of the camera between the (i−2)-th frame and the current frame may be determined by adding a pose variation of the camera between the (i−2)-th frame and the (i−1)-th frame and a pose variation of the camera between the (i−1)-th frame and the i-th frame. Further, a pose variation of the camera between the (i−3)-th frame and the current frame may be determined by adding a pose variation of the camera between the (i−3)-th frame and the (i−2)-th frame, the pose variation of the camera between the (i−2)-th frame and the (i−1)-th frame, and the pose variation of the camera between the (i−1)-th frame and the i-th frame. A pose variation of the camera between each of the remaining previous frames and the current frame may be determined in the same manner.

The electronic device may estimate the position change of the camera from each of the plurality of previous frames and the current frame based on a position change estimation model. For example, the electronic device may estimate a position change of the camera from the (i−5)-th frame and the current frame, and estimate a position change of the camera from the (i−4)-th frame and the current frame. A position change of the camera with respect to each of the remaining previous frames may be estimated in the same manner.

The electronic device may adjust the scale of the initial estimation result with respect to the pose variation of the camera to minimize an error between the position change and the position variation in the initial estimation result of the pose variation of the camera between each of the previous frames and the current frame. For example, the scale of the initial estimation result with respect to the pose variation of the camera may be adjusted to minimize the average of an error between the position change and the position variation in the initial estimation result between the (i−5)-th frame and the current frame, an error between the position change and the position variation in the initial estimation result between the (i−4)-th frame and the current frame, an error between the position change and the position variation in the initial estimation result between the (i−3)-th frame and the current frame, an error between the position change and the position variation in the initial estimation result between the (i−2)-th frame and the current frame, and an error between the position change and the position variation in the initial estimation result between the (i−1)-th frame and the current frame.

Although the plurality of previous frames are shown as five previous frames for ease of description in FIG. 4C, fewer or more previous frames may be used. For example, the plurality of previous frames may be two or more previous frames, two or more key frames, two or more previous frames that are not adjacent to each other, or a combination thereof.

At a second point in time 460 after the first point in time 450, the current frame may be an (i+1)-th frame, and the plurality of previous frames may be (i−4)-th, (i−3)-th, (i−2)-th, (i−1)-th, and i-th frames.

The electronic device may further estimate a pose variation of the camera based on the i-th frame and the (i+1)-th frame that are adjacent to each other, thereby estimating a pose variation of the camera between two points in time based on two adjacent frames. Since the pose variations of the camera based on two other adjacent frames, such as the pose variation of the camera between the (i−4)-th frame and the (i−3)-th frame, have been already estimated at the first point in time 450, the previously estimated values may be used to avoid a redundant operation. The descriptions provided with respect to the first point in time 450 may also apply to the remaining operation, and thus, a further detailed description thereof will be omitted.

Figure 5:
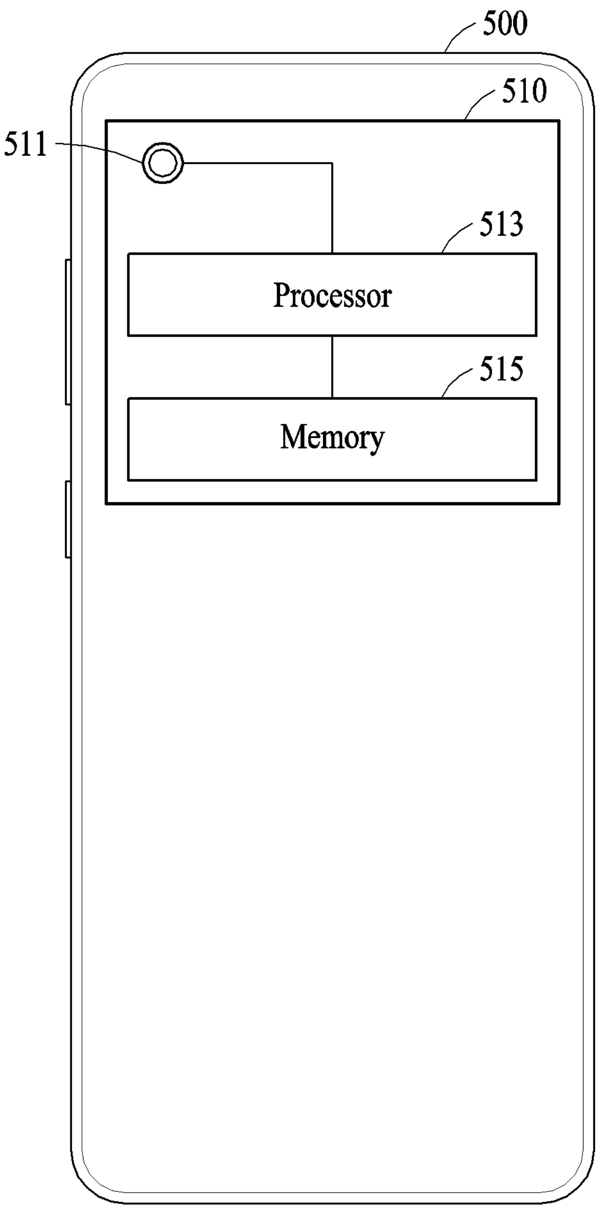
FIG. 5 illustrates an example of an electronic device, according to one or more embodiments.

FIG. 5 illustrates an example of an electronic device, according to one or more embodiments.

Referring to FIG. 5, a smart phone 500 equipped with a camera 511 is shown as an example. FIG. 1 has been described based on a vehicle, but examples are not limited thereto. The description in the present disclosure may also apply to any electronic device equipped with the camera 511 without limitation.

The smart phone 500 may include the camera 511, a processor 513, and a memory 515. Given that the camera 511 is disposed in the smart phone 500, when a pose of the camera 511 is estimated, the pose of the smart phone 500 may also be determined (e.g., may be one and the same). The memory 515 may be a volatile memory or non-volatile memory that stores computer-readable instructions. The processor 513 may perform the operations described above when the instructions stored in the memory 515 are executed by the processor 513. The processor 513 may obtain images captured at different points in time by the camera 511, estimate a position change of the camera 511 between the two points in time at which the images are captured based on a neural network, and estimate the position and/or orientation of the camera 511 based on the position change of the camera 511 and the images.

Although FIG. 5 shows the smart phone 500 as an example, the example of the electronic device is not limited thereto, and the descriptions provided above may also apply, with limitation, to various computing devices such as a smart phone, a tablet, an electronic book device and a laptop, various wearable devices such as a smart watch, smart glasses, a head-mounted display (HMD) and smart clothing, a smart vehicle, an Internet of Things (IOT) device, a walking assist device (WAD), a drone, or a robot.

Figure 6:
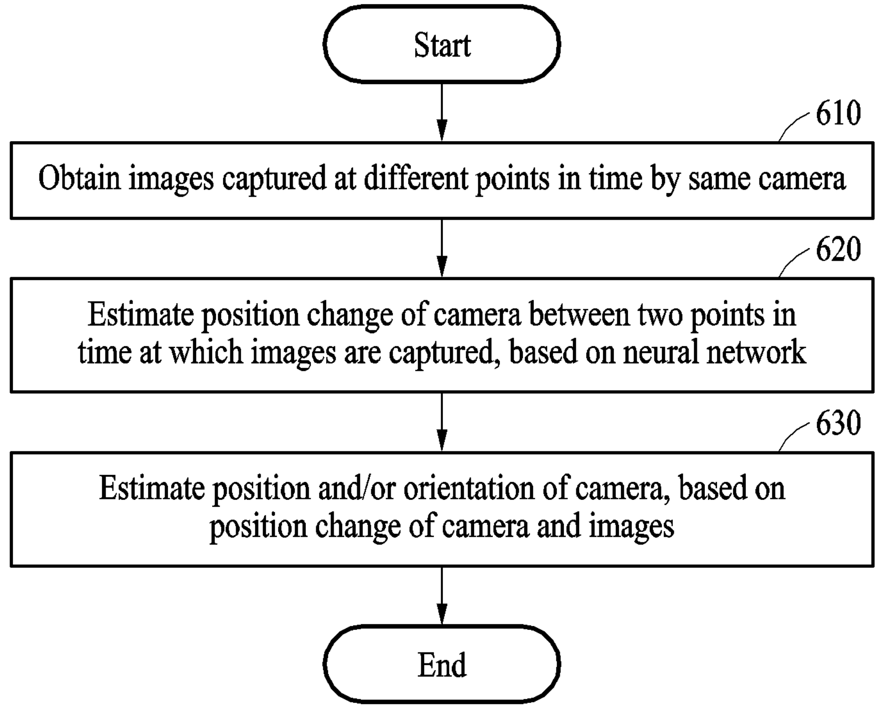
FIG. 6 illustrates an example method of operating an electronic device, according to one or more embodiments.

FIG. 6 illustrates an example of a method of operating an electronic device, according to one or more embodiments.

In the following examples, operations may or may not be performed sequentially. For example, the operations may be performed in different orders, and at least two of the operations may be performed in parallel. Operations 610 to 630 may be performed by at least one component (e.g., a processor) of an electronic device.

In operation 610, the electronic device obtains images captured at different points in time by the same camera.

In operation 620, the electronic device estimates a position change of the camera between the two points in time when the images were captured, based on a neural network. The neural network may be trained based on reference images collected together by a reference device and a reference position change of a reference camera between two reference points in time at which the reference images are captured, wherein the reference device may include the reference camera, and a reference position sensor and/or a reference inertial sensor. The reference images may be captured at different points in time by the reference camera. The reference position change may be determined by values sensed by the reference position sensor and/or the reference inertial sensor at the two reference points in time.

In operation 630, the electronic device estimates a position and/or orientation of the camera, based on the position change of the camera and the images. The electronic device may estimate the pose of the camera by performing a SLAM operation based on a result of matching feature points between the images and the position change of the camera. The electronic device may estimate the pose of the camera by adjusting a scale of the result of matching the feature points between the images according to the position change of the camera. The electronic device may estimate the pose of the camera by eliminating or minimizing, based on the position change of the camera, scale ambiguity occurring in the SLAM operation based on feature point matching between the images. The SLAM operation may be performed based on monocular visual SLAM based on a single camera corresponding to the camera.

The descriptions provided with reference to FIGS. 1 to 5 apply to the operations shown in FIG. 6.

Figure 7:
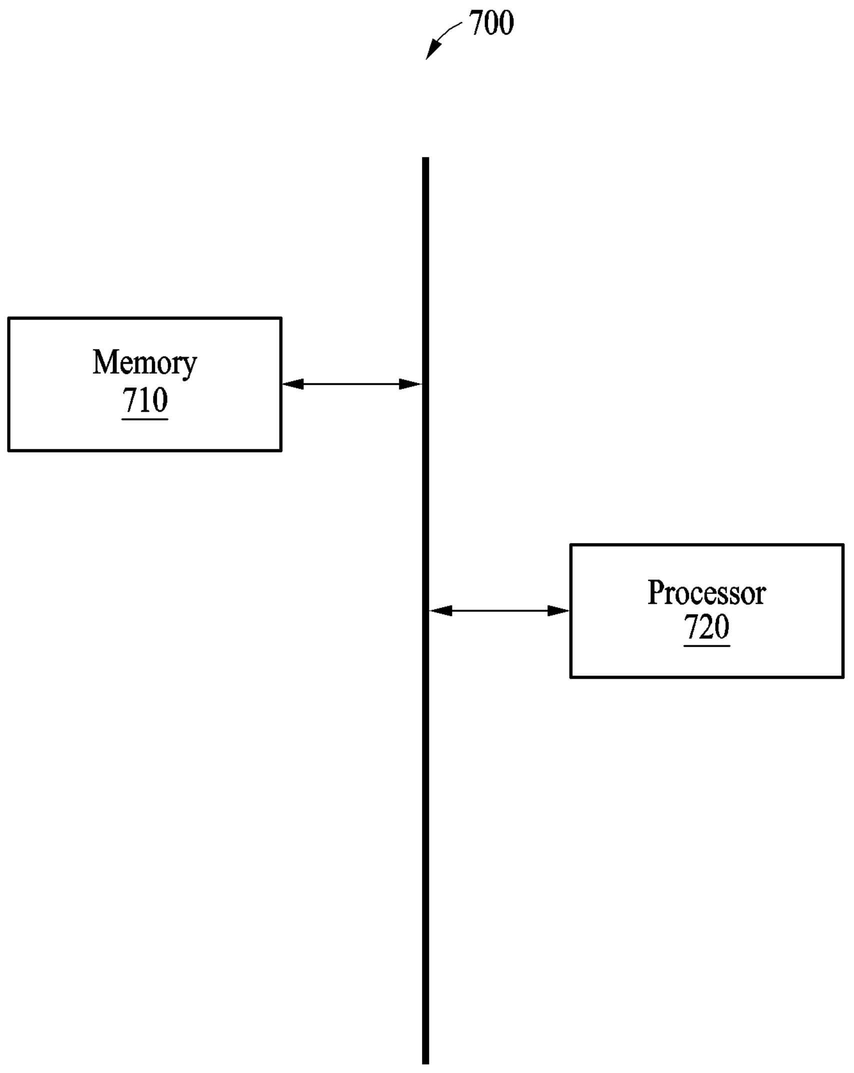
FIG. 7 illustrates an example electronic device, according to one or more embodiments.

FIG. 7 illustrates an example of an electronic device, according to one or more embodiments.

Referring to FIG. 7, an electronic device 700 may include a memory 710 and a processor 720. The memory 710 and the processor 720 may communicate with each other through a bus, peripheral component interconnect express (PCIe), and/or a network on a chip (NoC).

The memory 710 may include computer-readable instructions. The processor 720 may perform the operations described above when the instructions stored in the memory 710 are executed by the processor 720. The memory 710 may be a volatile memory or a non-volatile memory.

The processor 720 may be a device that executes instructions or programs or controls the electronic device 700 and may include, for example, a central processing unit (CPU) and/or a graphics processing unit (GPU). The processor 720 may obtain images captured at different points in time by the same camera, estimate a position change of the camera between the two points in time at which the images are captured based on a neural network, and estimate a position and/or orientation of the camera based on the position change of the camera and the images.

The computing apparatuses, the vehicles, the electronic devices, the processors, the memories, the image sensors/cameras, the vehicle/operation function hardware, the displays, the information output system and hardware, the storage devices, and other apparatuses, devices, units, modules, and components described herein with respect to FIGS. 1-7 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An electronic device, comprising:

one or more processors; and a memory storing instructions configured to, when executed by the one or more processors, cause the one or more processors to:

obtain two single images captured at two respective points in time by a same camera, estimate, by a simultaneous localization and mapping (SLAM) neural network, a position change of the camera that occurred during the time interval between the two points, wherein the estimating is based on the two single images, and wherein the position change is estimated as part of the SLAM neural network inferring features of the two single images, and based on the estimated position change of the camera, adjust a position and/or orientation of the camera determined based on the inferred features of the two single images.

2. The electronic device of claim 1, wherein the instructions are further configured to cause the one or more processors to estimate the position and/or orientation of the camera by performing a simultaneous localization and mapping (SLAM) operation based on the inferred features, wherein the SLAM operation estimates the camera position and/or orientation based on feature point matching between feature points in the inferred features of the two images, and wherein the SLAM operation is not an operation of the SLAM network.

3. The electronic device of claim 1, wherein the instructions are further configured to cause the one or more processors to adjust the position and/or orientation of the camera by adjusting a scale of the estimated camera position and/or orientation according to the estimated position change of the camera.

4. The electronic device of claim 3, wherein the initial estimation result for the pose variation comprises pose variations of the camera for time intervals between a current image and respective previous images, wherein the current image is one of the two images and the other of the two images is one of the previous images, and the estimated position change of the camera comprises estimated position changes of the camera between the current image and the respective previous images, wherein the instructions are further configured to cause the one or more processors to estimate the position and/or orientation of the camera by adjusting the scale of the initial estimation result so that an error between the pose variations and the estimated position changes of the camera is minimized.

5. The electronic device of claim 1, wherein adjusting the position and/or orientation of the camera based on the position change of the camera reduces scale ambiguity in a SLAM operation used to derive the position and/or orientation of the camera prior to the adjusting thereof.

6. The electronic device of claim 5, wherein the SLAM operation comprises a monocular visual SLAM algorithm configured for processing monocular images.

7. The electronic device of claim 1, wherein the SLAM neural network is trained based on reference images collected by a reference device and based on reference position changes of a reference camera for respective time intervals between times at which the reference images were captured, wherein the reference device comprises the reference camera, and a reference position sensor and/or a reference inertial sensor that senses positions upon which the reference position changes are based.

8. The electronic device of claim 7, wherein the reference images are captured at different respective reference points in time by the reference camera, and the reference position changes are determined by values sensed by the reference position sensor and/or the reference inertial sensor at the respective reference points in time.

9. The electronic device of claim 1, wherein the electronic device is, or is comprised in: an autonomous vehicle, a vehicle equipped with a driving assistance system, a vehicle supporting advanced driver-assistance systems (ADAS), a smartphone equipped with a camera, a wearable device, or a robot.

10. A method of operating an electronic device, the method comprising:

obtaining monocular images captured at different respective points in time by a same camera;

estimating, based on a neural network, a position change of the camera corresponding to the time between the points in time at which the images were captured, wherein the estimating is based on the monocular images of the camera and is not based on images from any other camera; and adjusting a position and/or orientation of the camera based on the estimated position change of the camera and based on the images.

11. The method of claim 10, wherein the adjusting of the position and/or orientation of the camera comprises performing a simultaneous localization and mapping (SLAM) operation based on feature point matching between the images to derive the position and/or orientation of the camera which is adjusted based on the estimated position change of the camera.

12. The method of claim 11, wherein the initial estimation result for the pose variation comprises pose variations of the camera for time intervals between a current image and respective previous images, wherein the current image is one of the two images and the other of the two images is one of the previous images, and the estimated position change of the camera comprises estimated position changes of the camera between the current image and the respective previous images, wherein the estimating the position and/or orientation of the camera is performed by adjusting the scale of the initial estimation result so that an error between the pose variations and the estimated position changes of the camera is minimized.

13. The method of claim 10, wherein the adjusting of the position and/or orientation of the camera comprises adjusting a scale of the position and/or orientation of the camera according to the position change of the camera.

14. The method of claim 10, wherein the adjusting of the position and/or orientation of the camera reduces scale ambiguity in a SLAM operation that derives the position and/or orientation of the camera, prior to the adjusting thereof, based on feature point matching between the images.

15. The method of claim 14, wherein the SLAM operation comprises a monocular visual SLAM operation that derives the position and/or orientation of the camera based on images of only the camera.

16. The method of claim 10, wherein the neural network is trained based on reference images collected by a reference device and based on reference position changes of a reference camera for respective time intervals between times at which the reference images are captured, wherein the reference device comprises the reference camera and a reference position sensor and/or a reference inertial sensor that senses the positions upon which the reference position changes are based.

17. The method of claim 16, wherein the reference images are captured at different respective reference points in time by the reference camera, and the reference position changes are determined by values sensed by the reference position sensor and/or the reference inertial sensor at the respective reference points in time.

18. A non-transitory computer-readable storage medium storing instructions that, when executed by a processor, cause the processor to perform the method of claim 10.

19. The method of claim 10, wherein the position change comprises a distance.

20. A method comprising:

inputting a first image captured by a camera at a first time and a second image captured by the camera at a second time to a simultaneous localization and mapping (SLAM) network, wherein the SLAM network, in inferring a first feature map and a second feature map from the first and second images, also outputs a camera-move distance inferred from the first and second images, the camera-move distance corresponding to movement of the camera from the first time to the second time;

matching features between the first and second feature maps to estimate an initial camera pose of the camera; and adjusting a scale of the estimated camera pose based on the camera-move distance.

* * * * *